United States Patent
Chandrupatla et al.

(10) Patent No.: US 8,086,737 B2
(45) Date of Patent: Dec. 27, 2011

(54) SYSTEM TO DYNAMICALLY DETECT AND CORRECT ERRORS IN A SESSION

(75) Inventors: Sunil Kumar Chandrupatla, San Jose, CA (US); Nachiket J. Deshpande, San Jose, CA (US); Saikrishnan Gopalakrishnan, San Jose, CA (US); Anirban Roy, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 888 days.

(21) Appl. No.: 11/297,205

(22) Filed: Dec. 7, 2005

(65) Prior Publication Data

US 2007/0127384 A1 Jun. 7, 2007

(51) Int. Cl.
*G06F 15/16* (2006.01)

(52) U.S. Cl. ........... 709/227; 709/221; 709/200; 717/4; 370/242; 370/252

(58) Field of Classification Search ........... 709/220, 709/221, 227; 714/4, 9; 370/351
See application file for complete search history.

(56) References Cited

U.S. PATENT DOCUMENTS

| | | | | |
|---|---|---|---|---|
| 5,790,521 A * | 8/1998 | Lee et al. | | 370/230 |
| 5,864,758 A * | 1/1999 | Moon | | 455/424 |
| 6,148,411 A * | 11/2000 | Ichinohe et al. | | 714/4 |
| 6,170,065 B1 * | 1/2001 | Kobata et al. | | 714/7 |
| 6,298,233 B1 * | 10/2001 | Souissi et al. | | 455/423 |
| 6,317,794 B1 * | 11/2001 | Papierniak et al. | | 709/229 |
| 6,393,486 B1 | 5/2002 | Pelavin et al. | | |
| 6,920,502 B2 * | 7/2005 | Araujo et al. | | 709/229 |
| 6,944,125 B1 * | 9/2005 | Salmanian | | 370/232 |
| 6,944,785 B2 * | 9/2005 | Gadir et al. | | 714/4 |
| 6,963,996 B2 * | 11/2005 | Coughlin | | 714/4 |
| 6,970,919 B1 * | 11/2005 | Doi et al. | | 709/220 |
| 7,020,797 B2 * | 3/2006 | Patil | | 714/4 |
| 7,103,666 B2 * | 9/2006 | Royer et al. | | 709/227 |
| 7,133,934 B1 * | 11/2006 | Rossello et al. | | 709/249 |
| 7,171,585 B2 * | 1/2007 | Gail et al. | | 714/25 |
| 7,206,826 B1 * | 4/2007 | Parker et al. | | 709/220 |
| 7,243,258 B2 * | 7/2007 | Ichinohe et al. | | 714/9 |
| 7,305,465 B2 * | 12/2007 | Wing et al. | | 709/223 |
| 7,509,400 B1 | 3/2009 | Tanner et al. | | |
| 7,743,138 B2 * | 6/2010 | Gallant et al. | | 709/224 |
| 7,761,794 B1 | 7/2010 | Chari et al. | | |
| 2003/0005107 A1 * | 1/2003 | Dulberg et al. | | 709/223 |
| 2003/0204769 A1 * | 10/2003 | Coughlin | | 714/4 |
| 2003/0212656 A1 * | 11/2003 | Sexton et al. | | 707/1 |
| 2004/0073641 A1 * | 4/2004 | Minhazuddin et al. | | 709/223 |
| 2004/0078787 A1 * | 4/2004 | Borek et al. | | 717/136 |
| 2004/0214555 A1 * | 10/2004 | Kumar et al. | | 455/414.1 |

(Continued)

FOREIGN PATENT DOCUMENTS

WO WO 2004030379 A1 * 4/2004

*Primary Examiner* — John Follansbee
*Assistant Examiner* — Anthony Mejia
(74) *Attorney, Agent, or Firm* — Cesari and McKenna, LLP

(57) ABSTRACT

A system for detecting and correcting an error in session between a client and a host over a network. When the system receives an indication of an error in a session, the system determines an error correction modification to the configuration of the session to correct the error. The system then implements the error correction modification to the configuration of the session and continues the session.

35 Claims, 5 Drawing Sheets

U.S. PATENT DOCUMENTS

| | | | |
|---|---|---|---|
| 2004/0226027 A1* | 11/2004 | Winter | 719/328 |
| 2005/0002384 A1* | 1/2005 | Larson et al. | 370/360 |
| 2005/0005015 A1* | 1/2005 | Hanners et al. | 709/227 |
| 2005/0044215 A1 | 2/2005 | Cohen et al. | |
| 2005/0117586 A1* | 6/2005 | Ikeda et al. | 370/395.21 |
| 2005/0120112 A1* | 6/2005 | Wing et al. | 709/224 |
| 2005/0213509 A1* | 9/2005 | Collomb et al. | 370/252 |
| 2005/0240393 A1* | 10/2005 | Glosson | 704/8 |
| 2006/0070114 A1* | 3/2006 | Wood et al. | 726/2 |
| 2006/0101029 A1* | 5/2006 | Gordon | 707/100 |
| 2006/0123122 A1* | 6/2006 | Jung et al. | 709/227 |
| 2006/0209851 A1* | 9/2006 | Scudder et al. | 370/401 |
| 2007/0011507 A1* | 1/2007 | Rothman et al. | 714/718 |
| 2007/0039049 A1* | 2/2007 | Kupferman et al. | 726/22 |
| 2007/0070883 A1* | 3/2007 | Lysne et al. | 370/218 |
| 2007/0070975 A1* | 3/2007 | Otani et al. | 370/351 |
| 2007/0130325 A1* | 6/2007 | Lesser | 709/224 |

* cited by examiner

SYSTEM TO DYNAMICALLY DETECT AND CORRECT ERRORS IN A SESSION

FIELD OF THE INVENTION

This invention relates to a session between a client system and a service provider system over a network. More particularly, this invention relates to a system for detecting an error in the session. Still more particularly, this invention relates to a system that detects an error and modifies the configuration of the session to correct the error and change the behavior of the session.

PRIOR ART

In today's society, it is common for a client to use a remote computer to connect to a host that provides a service over a network. It is a problem that the session may fail at any one of different stages of the session. Reasons for a failure include, but are not limited to, authentication failures, administrative errors, misconfigured authorization data, and system errors due to system limitations. Currently, when an error causing a failure occurs, the session is terminated.

When a failure occurs, the administrator of the host must manually correct the error. In many systems, the administrator relies on the client calling a support telephone number to be made aware of the failure. This is a problem for the client because the client must spend time calling the support number and talking to a representative of the host. This is also a problem for the host because support telephone number must be maintained and manned by an employee. Thus, those skilled in the art are constantly striving to improve on systems for detecting and correcting errors in a session.

SUMMARY OF THE INVENTION

The above and other problems are solved and an advance in the art is made by a system for dynamically detecting and correcting errors in a session in accordance with this invention. A first advantage of a system in accordance with this invention is that the system does not terminate a session for all errors. A second advantage of a system in accordance with this invention is that an administrator no longer has to manually correct all errors. A third advantage of a system in accordance with this invention is that a customer does not have to call the administrator as frequently to correct errors encountered in a session.

In accordance with this invention, a system for dynamically detecting and correcting errors in accordance with this invention operates in the following manner. A router and/or server providing a connection over a network for the session receives an indication of an error for the session. Some examples of indications of errors may include but are not limited to messages transmitted from other processes and/or connected devices flags, console debugs, and accounting records. When an indication of an error is received, an error correction modification to the configuration of the session is read from a memory of the router and/or server. The error correction modification is then implemented in the configuration of the session to change the behavior of the session and the session is allowed to continue.

In some embodiments, the error correction modification to the configuration is determined by the error indicated. In other embodiments, the error correction modification to the configuration may be determined by the user of the session. In still other embodiments, the modification of the configuration may be determined by the Quality of Service provided to the user of the session. In these embodiments, the indication of the error may include an identification of the user and/or an indication of the Quality of Service provided to the user.

In some embodiments of a system in accordance with this invention, the router may store a default error correction modification for the configuration of a session for the error. The router may then receive an input of a modification of the configuration for the error. The router then stores the input modification in memory and uses the input error correction modification when an indication of the error is received.

BRIEF DESCRIPTION OF THE DRAWINGS

The above and other advantages and features of this invention are set forth in the following Detailed Description and are shown in the following drawings.

DETAILED DESCRIPTION

Figure 1:
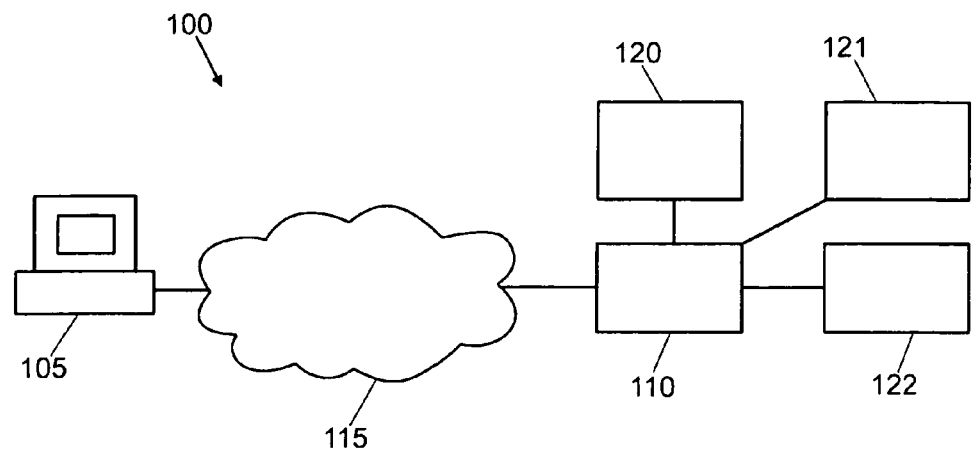
FIG. 1 illustrating a network connecting a client to a host for a session.

This invention relates to providing a system that dynamically detects and corrects errors in a session. In the following disclosure, the same reference numeral is used for a component shown in different figures.

FIG. 1 illustrates network 100 in which a session is being provided to client 105 by host 110. Client 105 is a processing system such as a laptop computer or a desktop computer Client 105 communicates with host 110 over network 115. Network 115 may be a telephone system, a Wide Area Network (WAN), (LAN), or the Internet. Client 105 includes hardware and software for connecting to network 115 and communicating over network 115.

Host 110 is a processing system that connects other processing systems 120-122 to network 115. Host 110 may be a router, switch, server, or any other type of processing device that connects to a network to communicate with other systems. In this exemplary embodiment, host 110 is a router and systems 120-122 include servers that provide various applications for connected devices over the network. Some examples of connected processing systems 120-122 include but are not limited to, an authentication server, an account server, and a database server.

Figure 2:
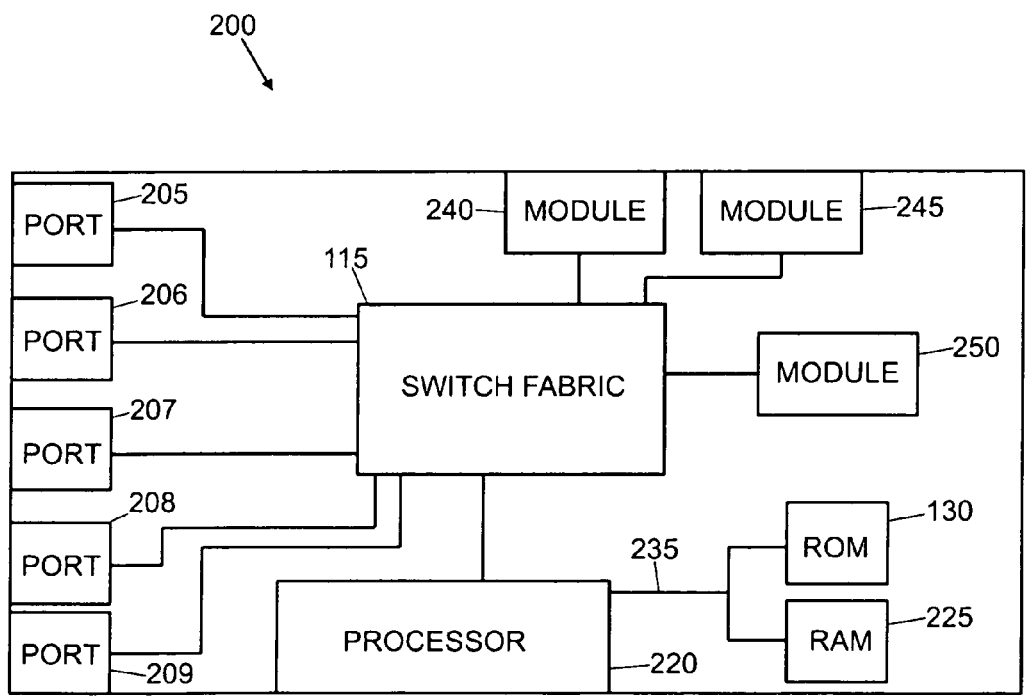
FIG. 2 illustrating a block diagram of an exemplary embodiment of a processing system in the host that performs a system for detecting and correcting errors in accordance with this invention.

FIG. 2 illustrates a block diagram of router 200 which acts as host 110 of FIG. 1 in this exemplary embodiment. Network device 200 is a switching system that transmits digital data, in the form of packets between processing systems connected to a network. One skilled in the art will recognize that network device 200 may be a router, switch or any other processing system that receives and transmits digital data.

Network device 200 includes ports 205-209. Ports 205-209 connects network device 200 to other processing systems in a network. The other processing systems that may be connected include computers, other routers or any other digital processing systems. One skilled in the art will further recognize that ports 205-209 are shown for exemplary purposes only and the exact number and configuration of the ports are left to one skilled in the art designing a specific network.

Ports 205-209 are connected to switch circuitry 215. Switch circuitry 215 is circuitry that transmits received packets to the proper ports for delivery to the proper address. One skilled in the art will recognize that there are many different types of circuitry that may be used to transmit packets between proper ports and an explanation of the switching circuitry is not critical to this invention and is omitted for brevity.

Processing unit 220 is connected to switching circuitry 215. Processing unit 220 is a processor, microprocessor, or any combination of processors and microprocessors that execute instructions to perform applications for performing functions in network device 200. Processing unit 220 is also connected to a volatile memory 225 and a non-volatile memory 230 via memory bus 235.

Volatile memory 225 is a memory such as a Random Access Memory (RAM). A volatile memory stores instructions and data used by processing unit 220 to perform applications. One such application is a router operating system. The routing operating system is an application which allows network device 200 to perform other applications that provide the functions of network device 200. An example of a router operating system is Inter-network Operating System (IOS) designed by Cisco Systems Inc. One skilled in the art will recognize that many different types of memory may be used a non-volatile memory such SRAM and DRAM.

Non-volatile memory 230 is a memory such as a Read Only Memory (ROM). Non-volatile memory 230 stores configuration and other vital information for router 100. One skilled in the art will recognize that there are many different types of memory that may be used as a non-volatile memory.

Modules 240, 245, and 250 are connected to switching circuitry 215. Modules 240, 245, and 250 are device and/or software that prepare specific features in network device 200. An example of a module is a Voice Over Internet Protocol (VoIP) module for providing telephonic communications to processing devices connected to network device 200. One skilled in the art will recognize that the number of modules and the functions provided by each module may be determined by one skilled in the art designing a particular network device.

Figure 3:
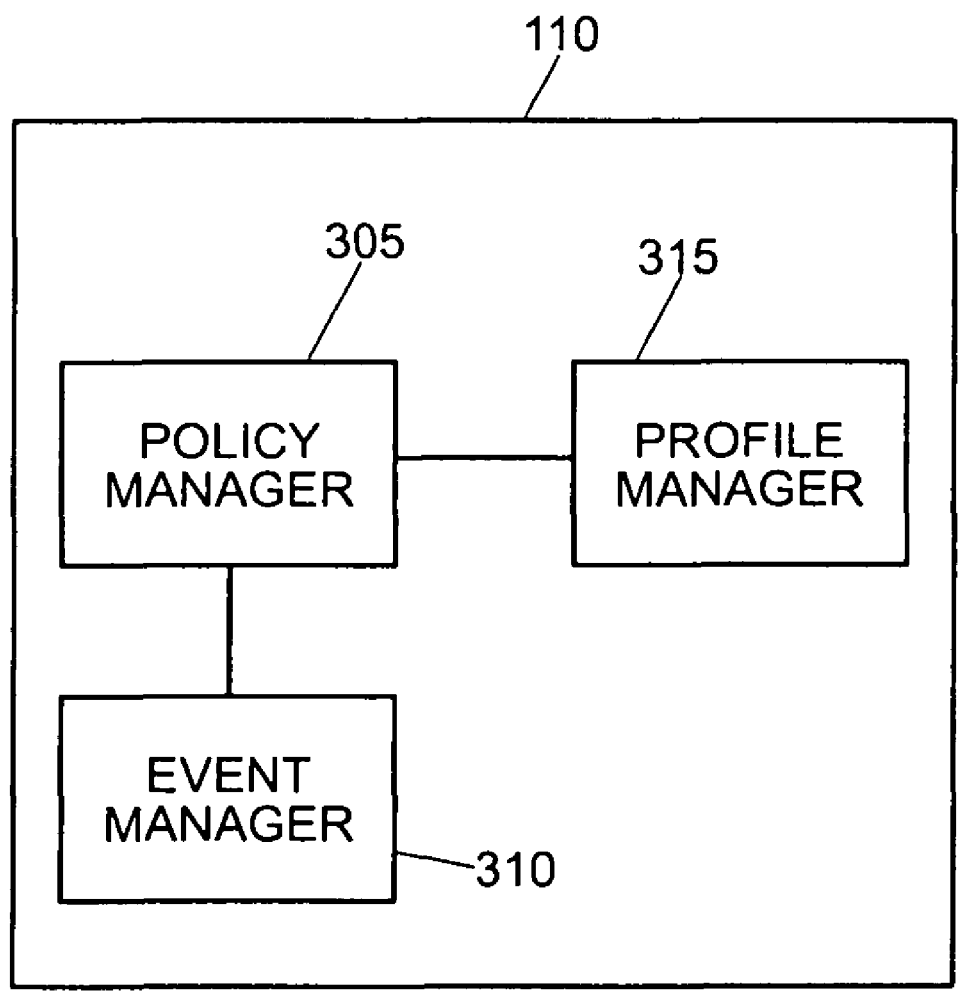
FIG. 3 illustrating a block diagram of an exemplary embodiment of software components that are executed by the processing system in the host to provide a system in accordance with this invention.
Figure 4:
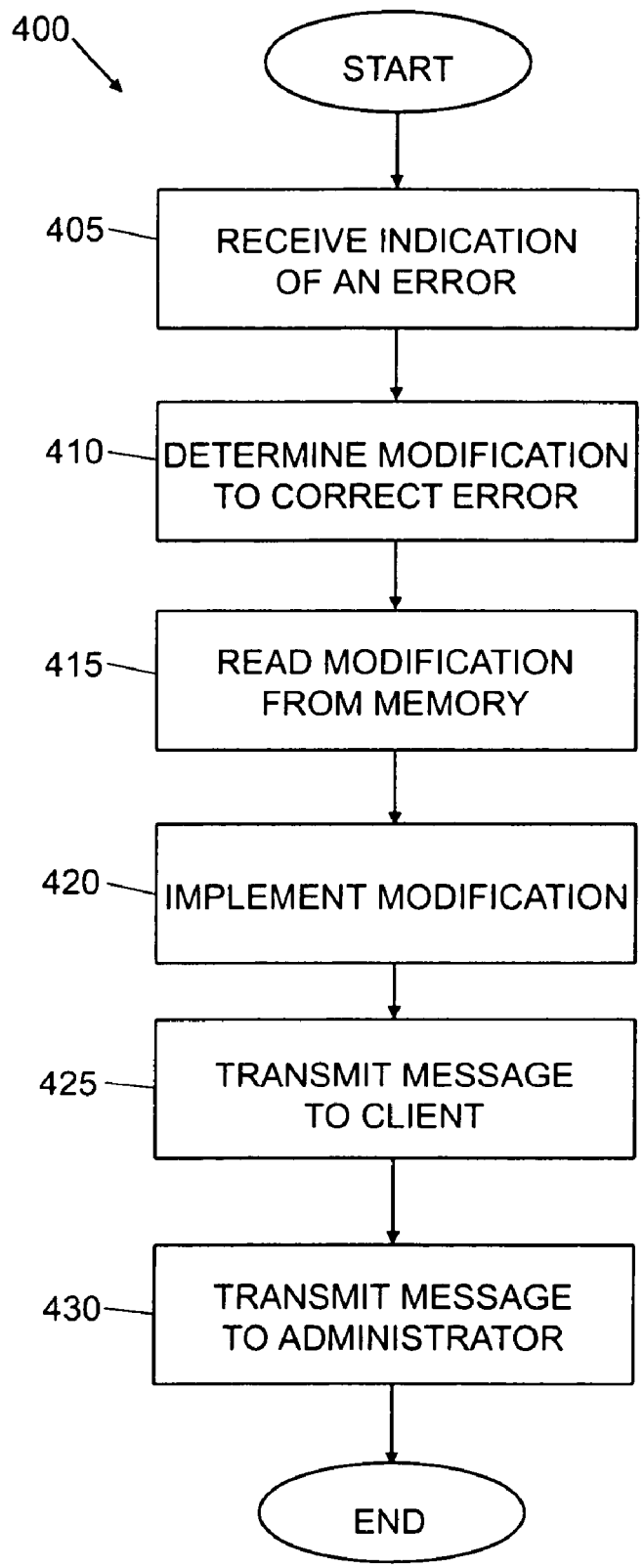
FIG. 4 illustrating a flow diagram of an exemplary embodiment of a process for providing the system in accordance with this invention.
Figure 5:
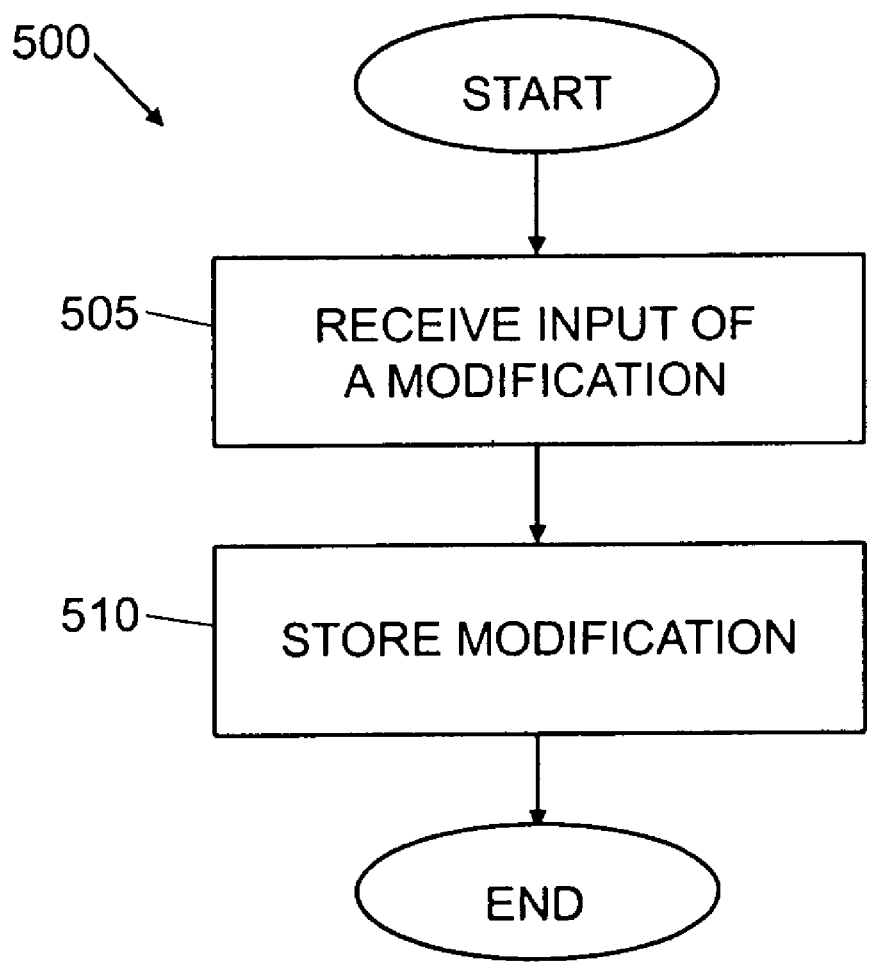
FIG. 5 illustrates a flow diagram of an exemplary embodiment for adding a modification to correct an error.

This invention relates to a system for dynamically detecting and correcting errors in a session. In accordance with this invention, the system is provided by processes executed from software and/or firmware instructions stored in a memory readable by a processing unit as shown and described in FIGS. 3-5. FIG. 3 illustrates a conceptual block diagram of software components that provide the system in an exemplary embodiment of this invention. FIG. 4 illustrates a flow diagram of the process providing the system in accordance with this invention. FIG. 5 illustrates a flow diagram of the process performed by the software components in an exemplary embodiment of this invention.

FIG. 3 illustrates a conceptual diagram of software applications in host device 110 that provide the system in accordance with this invention. One skilled in the art will recognize that the instructions for each of the shown processes is stored a volatile active memory of host device 110 such as a RAM, DRAM, SRAM. One skilled in the art will further appreciate that the instructions of the shown software components are modified to provide a system in accordance with this invention.

Host 110 provides a policy manager 305, event manager 310, and profile manager 315. Event manager 310 is a software application that receives messages, flags, and other indications that an event such as an error occurs. Event manager 310 then communicates with the proper software and/or hardware to respond to the indicated event. In accordance with this invention, event manager 310 receives an indication of an error in a session. In response to receiving the indication, event manager 310 transmits an indication of an error to Policy manager 305. In some embodiments of the invention, the indication of the error may include the error, a user of the session, and/or a Quality of Service provided to the user of the session. It is envisioned that other information that can be used to correct the error may be included in the indication transmitted.

Policy manager 305 receives indications from event handler 315 that an event has occurred and determines the rule for handling the event. Policy manager 305 then executes the policy for handling the event. In accordance with this invention, policy manager 305 receives an indication of an error from event manager 310. Policy manager 305 then sends a request to profile manager 315 for rule for handling the error. The rule is a modification to the configuration of the session to correct the error. In accordance with this invention, a modification to the configuration is a change to connection between client 105 and host 110 that corrects the error. Some examples of modification to the configuration can include but are not limited to changing a port on a router handling transmissions for the session; changing a server and/or router handling the session; and allowing a session to proceed without proper authentication.

The Profile manager 315 maintains profiles for various events and errors that indicate actions to take in response to an event. One skilled in the art will recognize that profiles may be stored in a variety of manners. For example, each error may have a different object stored for handling the error, a file storing information for changing the configuration, or a database storing the information each error. In accordance with this invention, profile manager 315 receives the request for the modification for the error. Profile manager 315 then retrieves the proper modification and transmits the modification to policy manager 315 which implements the modification. One skilled in the art will recognize that the proper modification can be determined from the error detected, the user, the Quality of Service of the user, a combination including any of the three previous items, or any other parameters a designer determines.

FIG. 4 illustrates an exemplary process 400 for providing a system in accordance with this invention. Process 400 begins in step 405 by receiving an indication of an error in a session. The indication may be a message, a flag in a data stream or any other manner of identifying a particular error in the session. In step 410, an error correction modification to the configuration of the session to correct the indicated error is determined. An error correction modification is a change to the configuration of the session that eliminates the error condition. The error correction modification may be a change to a property of the session or to the link over the network providing the session. The modification used to change the configuration may be determined from the indicated error, the user of the session, the Quality of Service provided to the user or other parameters.

In step 415, process 400 reads the error correction modification of the configuration from memory. The error correction modification of the configuration of the session is then implemented in step 420 to change the behavior of the session. In step 425, a message is then sent to the client systems in some embodiments to indicate that the error correction modification to the configuration has been implemented to correct the error. A message indicating that the modification has been implemented may also be transmitted to an administrator system in step 430. This message may include information about the error and the modification to allow an administrator to change network configuration to further correct errors. After step 430, process 400 ends.

FIG. 5 illustrates a process 500 for adding a modification to correct an error in accordance with an exemplary embodiment of this invention. Process 500 begins in step 505 by receiving an input of an error correction modification of a session configuration to the system. The input may be received as messages transmitted over the network or as input by an I/O device used by the administrator.

In step 510, the received error correction modification is stored into the memory storing the error correction modifications. This may include placing data for the modification in a proper format, generating a new object for the modification, editing an existing modification, storing information for determining when the modification is to be used, and/or storing the modification in memory. After the error correction modification is stored in memory, the modification may be used to correct an error and process 500 ends.

Figure 6:
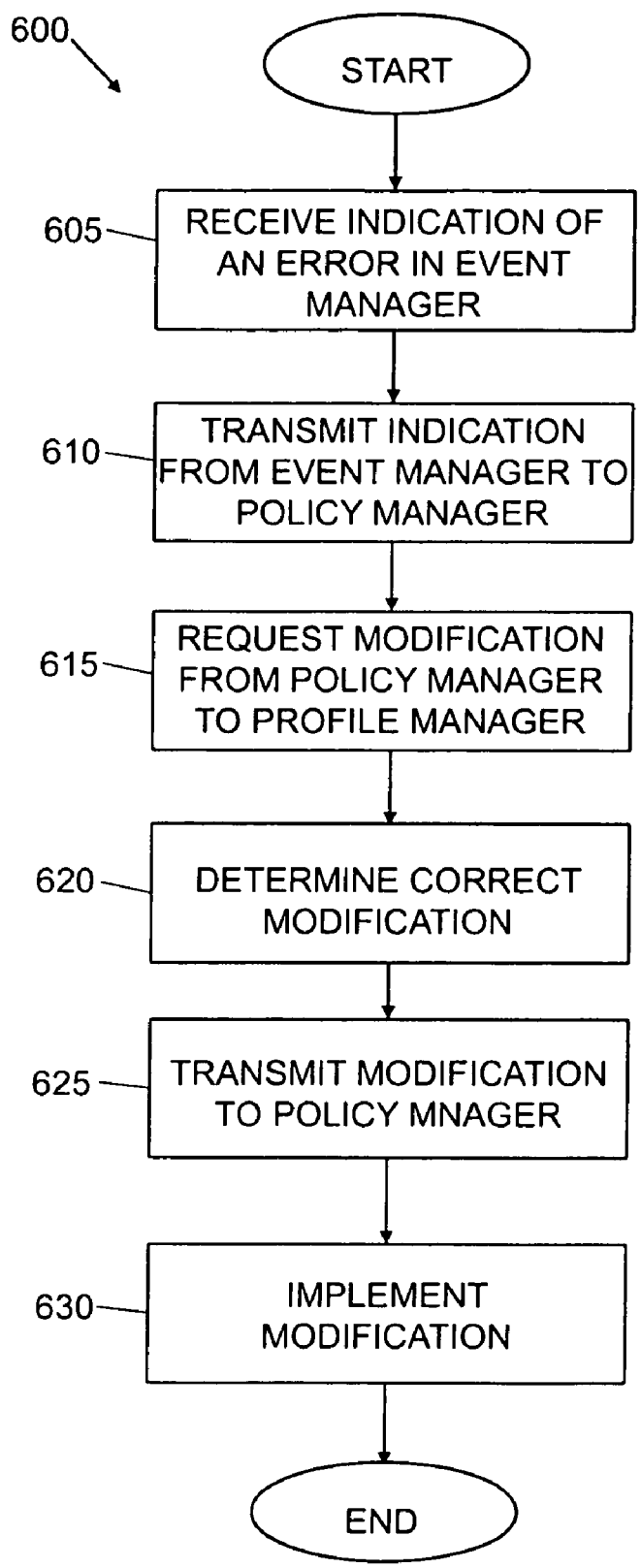
FIG. 6 illustrates a flow diagram of an exemplary embodiment for a process for correcting an error.

The following is a flow diagram of a process used by the exemplary embodiment shown in FIG. 3 in accordance with this invention. FIG. 6 is a flow diagram of process 600 for correcting an error in accordance with this invention. Process 600 begins in step 605 with event manager 315 receiving an indication of an error in the session. The indication may be an error message, a flag, or other type of indication that an error has occurred in the session.

In step 610, the event manager passes the indication of the error to policy manager 310. The policy manager receives the indication of the error and transmits a request for a modification to the configuration to correct the error to a profile manager in step 615. The request includes the information needed by the policy manager to determine the proper modification needed to correct the error. This may include, the error type, the user of the session, and/or the quality of service provided to the user for the session. In step 620, the profile manager determines the proper modification to correct the error.

The profile manager then either transmits the modification to the policy manager in step 625. The policy manager then implements the implementation in the configuration in step 630 and process 600 ends.

The above is descriptions of exemplary embodiments in accordance with this invention. It is envisioned that those skilled in the art can and will design alternative systems that infringe on this invention as set forth in following claims either literally or through the Doctrine of Equivalents.

What is claimed is:

1. A method for correcting errors in a session between a client and a server over a connection in a network, comprising:
   receiving an input of one or more error correction modifications for configuration of sessions between clients and servers;
   generating one or more new objects for said one or more error correction modifications for configuration of sessions between clients and servers;
   storing said one or more new objects for the one or more error correction modifications for configuration of sessions between clients and servers in a memory;
   receiving an indication of an error in said session between said client and said server;
   reading, from said memory that stores said one or more new objects for the one or more error correction modifications, an error correction modification of said one or more error correction modifications that corresponds to the received error indication for said session between said client and said server, responsive to receiving said indication of said error in said session;
   implementing said error correction modification to change said configuration of said session between said client and said server to correct said error in said session; and
   continuing said session between said client and said server, after implementation of said error correction modification to said configuration of said session.

2. The method of claim 1 wherein said step of reading said error correction modification comprises:
   determining said error in said session indicated by said indication;
   determining said error correction modification based upon said error in said session; and
   reading said error correction modification determined from said error in said session from said memory.

3. The method of claim 1 wherein said step of reading said error correction modification comprises:
   determining said error correction modification based upon an identification of said client.

4. The method of claim 3 wherein said indication of said error in said session includes said identification of said client.

5. The method of claim 1 wherein said step of reading said error correction modification further comprises:
   determining said error correction modification based upon a Quality of Service provided to said client; and
   reading said error correction modification from said memory responsive to said determination.

6. The method of claim 5 wherein said indication of said error in said session includes said Quality of Service for said client.

7. The method of claim 1 wherein said error correction modification stored in said memory for said error in the session is a default error correction modification.

8. The method of claim 7 further comprising:
   wherein said step of reading includes selecting said error correction modification for said error in said session.

9. A memory storing one or more instructions for correcting errors in a session between a client and a server over a network, the one more instructions including instructions which executed by one or more processors, cause the one or more processors to:
   receive an input of one or more error correction modifications for configuration of sessions between clients and servers;
   generate one or more new objects for said one or more error correction modifications for configuration of sessions between clients and servers;
   store said one or more new objects for the one or more error correction modifications for configuration of sessions between clients and servers in a memory;
   receive an indication of an error in a session between said client and said server;
   read, from said memory that stores said one or more new objects for the one or more error correction modifications, an error correction modification of the one or more error condition modifications that corresponds to the received error indication for said session between said client and said server, responsive to receiving said indication of said error in said session;

implement said error correction modification to change said configuration of said session between said client and said server to correct said error in said session; and continue said session between said client and said server, after implementation of said error correction modification to said configuration of said session.

10. The memory of claim 9 wherein said instructions which executed by one or more processors cause the one or more processors to read said error correction modification comprise instructions to:

determine said error in said session indicated by said indication;

determine said error correction modification based upon said error in said session; and read said error correction modification determined from said error in said session from said memory.

11. The memory of claim 9 wherein said instructions which executed by one or more processors cause the one or more processors to read said error correction modification based upon said error in said session comprise instructions to:

determine said error correction modification based upon an identification of said client.

12. The memory of claim 11 wherein said indication of said error in said session includes said identification of said client.

13. The memory of claim 9 wherein said instructions which executed by one or more processors cause the one or more processors to read said error correction modification further comprise instructions to:

determine said error correction modification based upon a Quality of Service provided to said client; and read said error correction modification from said memory responsive to said determination.

14. The memory of claim 13 wherein said indication of said error in said session includes said Quality of Service for said client.

15. The memory of claim 9 wherein said error correction modification stored in said memory for said error in said session is a default error correction modification.

16. The memory of claim 15 wherein said read selects said user error correction modification for said error in said session.

17. A router that provides a session between a client and a server over a network, having a memory that stores instructions for correcting an error detected in said session, wherein said instructions configure said router to:

receive an input of one or more error correction modifications for configuration of sessions between clients and servers;

generate one or more new objects for said one or more error correction modifications for configuration of sessions between clients and servers;

store said one or more new objects for the one or more error correction modifications for configuration of sessions between clients and servers in a memory;

receive an indication of said error in said session between said client and said server;

read, from said memory that stores said one or more new objects for one or more error correction modifications, an error correction modification of the one or more error correction modifications that corresponds to the received error indication for said session between said client and said server, responsive to receiving said indication of said error in said session;

implement said error correction modification to change said configuration of said session between said client and said server to correct said error in said session; and continue said session between said client and said server after implementation of said error correction modification to said configuration.

18. The router of claim 17 wherein said instructions that configure said router to read said error correction modification configure said router to:

determine said error in said session indicated by said indication;

determine said error correction modification based upon said error in said session; and read said error correction modification determined from said error from said memory.

19. The router of claim 17 wherein said instructions that configure said router to read said error correction modification configure said router to:

determine said error correction modification based upon an identification of said client.

20. The router of claim 19 wherein said indication of said error in said session includes said identification of said client.

21. The router of claim 17 wherein said instructions that configure said router to determine said error correction modification configure said router to:

determine said error correction modification based upon a Quality of Service provided to said client; and read said error correction modification from said memory responsive to said determination.

22. The router of claim 21 wherein said indication of said error in said session includes said Quality of Service for said client.

23. The router of claim 17 wherein said error correction modification stored in said memory for said error in said session is a default error correction modification.

24. The router of claim 23 wherein said instructions that configure said router to read select said user error correction modification for said error in said session.

25. A method comprising:

receiving an input of one or more error correction modifications for configuration of sessions between clients and servers in a network;

generating one or more new objects for said one or more error correction modifications;

storing said one or more new objects for the one or more error correction modifications in a memory along with a plurality of objects for various types of errors, each object indicating an error correction modification for uses with a corresponding type of error in sessions;

receiving an indication that an error has occurred in a session between a client and a server in the network, said indication identifying a type of said error in said session;

accessing an object stored in said memory that corresponds to said type of said error in said session between said client and said server, in response to receiving the indication that the error has occurred in said session between said client and said server;

implementing an error correction modification from said object to change a configuration of said session between said client and said server to correct said error in said session, absent termination of said session between said client and said server; and continuing said session between said client and said server, after implementation of said error correction modification.

26. The method of claim 25 wherein said implementing is performed absent manual action by an administrator of said network.

27. The method of claim 25 wherein said indication further identifies one or more of a user of said session and a Quality of Service (QoS) provided to said user of said session.

28. The method of claim 25 wherein said error correction modification comprises changing a port on a router that is used to transmit data for said session.

29. The method of claim 25 wherein said error correction modification comprises changing a router used with said session.

30. The method of claim 25 wherein said error correction modification comprises allowing said session to proceed without authentication.

31. An apparatus comprising:
a memory;
a plurality of ports;
an event manager that receives an indication on one of the ports that an error has occurred in a session between a client and a server, said indication identifying a type of said error;
a profile manager to receive an input of one or more error correction modifications for session configuration, generate one or more new objects for the received one or more error correction modifications, store said one or more new objects for said one or more error correction modifications in memory along with a plurality of objects for various types of errors that indicate an error correction modification for use with a corresponding type of error in said session;
a policy manager that interacts with the profile manager to retrieve an object of the plurality of objects that corresponds to said type of said error in said session, and implements an error correction modification, from the one or more error correction modifications, from said object to change a configuration of said session between said client and said server to correct said error in said session, absent termination of said session between said client and said server.

32. The apparatus of claim 31 wherein said indication further identifies one or more of a user of said session and a Quality of Service (QoS) provided to said user of said session.

33. The apparatus of claim 31 wherein said error correction modification comprises changing a port of said plurality of ports on said apparatus that is used to transmit data for said session.

34. The apparatus of claim 31 wherein said error correction modification comprises changing a router used with said session.

35. The apparatus of claim 31 said error correction modification comprises allowing said session to proceed without authentication.

* * * * *